United States Patent
Verheecke

[19]
[11] Patent Number: 6,163,792
[45] Date of Patent: *Dec. 19, 2000

[54] PROCESS FOR THE AUTOMATION OF INFORMATIC PROCEDURES AND DEVICE THEREFOR

[76] Inventor: Eric Julien Verheecke, 270, rue de Cernay, F - 51100 Reims, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/762,122

[22] Filed: Dec. 9, 1996

[30] Foreign Application Priority Data

Dec. 12, 1995 [IT] Italy .................................. MI95A2591

[51] Int. Cl.[7] .............................. G06F 9/00; G06F 3/00; G06F 1/28
[52] U.S. Cl. ........................... 709/102; 710/15; 713/310; 713/330
[58] Field of Search ..................................... 395/672, 835, 395/750; 364/221, 221.7, 221.9, 231.5; 709/102; 710/15; 713/310, 330

[56] References Cited

U.S. PATENT DOCUMENTS

| | | | |
|---|---|---|---|
| 4,101,878 | 7/1978 | Shimizu et al. | 340/310.01 |
| 4,328,556 | 5/1982 | Abe et al. | 364/140 |
| 4,611,289 | 9/1986 | Coppola | 364/492 |
| 4,757,505 | 7/1988 | Marrington et al. | 714/22 |
| 4,800,521 | 1/1989 | Carter et al. | 395/672 |
| 5,113,502 | 5/1992 | Merrill et al. | 395/672 |
| 5,200,998 | 4/1993 | Bakaher et al. | 714/6 |
| 5,619,655 | 4/1997 | Weng et al. | 395/200.56 |
| 5,692,197 | 11/1997 | Narad et al. | 713/323 |
| 5,699,428 | 12/1997 | McDonnal et al. | 713/165 |
| 5,717,934 | 2/1998 | Pitt et al. | 395/750.07 |
| 5,745,391 | 4/1998 | Topor | 713/321 |
| 5,751,950 | 5/1998 | Crisan | 713/202 |
| 5,794,031 | 8/1998 | Nakadai | 713/2 |
| 5,923,099 | 7/1999 | Bilir | 307/64 |
| 5,949,974 | 9/1999 | Ewing et al. | 709/202 |

*Primary Examiner*—Saleh Najjar
*Assistant Examiner*—Andrew Caldwell
*Attorney, Agent, or Firm*—R. Neil Sudol; Henry D. Coleman; William J. Sapone

[57] ABSTRACT

A device for executing informatic procedures, including activities of end of day and/or data safety procedures, for data processing systems, includes at least one component for requesting the starting of data processing procedures. The device further includes a storing and processing component adapted to receive a procedure starting request signal output from the request component. The storing and processing component is adapted to command the procedures be automatically executed and to drive supply cut-off elements for automatically cutting off the supply to all or part of at least one of the data processing systems at the end of the procedures. The storing and processing component incorporates an address decoder adapted to identify a computer comprising part of the data processing system, a detector connected to the decoder for detecting the status of the request component, a communication line manager driven by the detector, a store or register for storing or memorizing the request of stopping the computer, and a timer adapted to create a timing after which controls are actuated for controlling the power supply cut-off elements to interrupt a power supply to all or part of the data processing system.

17 Claims, 7 Drawing Sheets

PROCESS FOR THE AUTOMATION OF INFORMATIC PROCEDURES AND DEVICE THEREFOR

BACKGROUND OF THE INVENTION

The present invention relates to a process and device for automating informatic procedures, without the intervention of an operator.

It is known that the user of an informatic system has to perform a number of procedures for managing data which is used and stored in a usual processing device, such as an electronic computer.

Said procedures may relate for example to the end of day, the definition of daily data relevant to turnover, purchase volume, product inventory, exploiting of daily data for drafting the papers to be sent on the following day, restocking calculation, and so on.

In addition, the user is requested to reorganize, select, and update data, copy temporary created files, check for the presence of viruses possibly present in the various files, create a copy or back-up copy of Winchester disks or removable disks on magnetic or magneto-optical media, send or receive via modem any kind of information to another informatic system, park the reading head of a Winchester disk in the adapted safety zone before stopping said disks, rearrange the files stored on the disk so as to optimize disk space occupation and disk access time, update the file index table, and run a diagnostic test about the status of the informatic system.

Each of the above mentioned procedures is currently carried out on the basis of commands issued by the system user, for every single procedure.

Usually, said commands are either integrated in the operating system of the informatic unit, or adapted programs for specific functions.

The installation of such adapted programs requires an operator in order to have them integrated on user-friendly menus.

Accordingly, a resulting drawback is that a skilled operator is required for the installation, with times and costs increased accordingly.

In addition, the standardization of such procedures is opposed by the peculiarity of each utilization. The procedures of result analysis are complicated and require trained and qualified personnel, which does not ensure absolute reliability in the daily use thereof.

SUMMARY OF THE INVENTION

The aim of the present invention is therefore to provide a method and a device for the automatic execution of a number of informatic procedures relevant to an informatic system.

Within this aim, it is an object of the present invention to provide a process and device which allow the execution of both daily routine procedures and safety procedures.

Another object of the present invention is to provide a process and device for protecting, processing, and analysing data without the assistance of an operator.

It is another object of the invention to provide a device which can be connected on one side thereof to the network and on the other side to a pre-existing informatic device in order to supply it.

Another object is to provide a method and device which allow, at the end of operator's working day, the automatic execution of user programs on the informatic system, such as scanning for viruses, zipping, up-dating to the network, postponed print-outs, and the like.

Another object of the present invention is to provide a process and device which allow, at the end of the execution of the various procedures, the disconnection of the informatic system from the mains.

Still another object of the present invention is to provide a process and device, which allow to execute a set of processing procedures automatically, by linking them to one another.

Still a further object of the present Invention is to provide a process and device for executing automatically procedures compatible with any kind of operating system.

Still another object of the invention is to provide a process and method which increases the working time of the user on an informatic system.

Not the least object of the invention is to provide a process and device which have a high reliability, and are comparatively easy to be manufactured with low costs.

This aim, these objects, and others which will become more apparent hereinafter are achieved by a device for executing informatic procedures, including activities of end of day and/or data safety procedures, for computers, peripheral units, computer networks, and the like, comprising:

at least one request means for requesting the starting of data processing procedures;

storing and processing means adapted to receive a procedure starting request signal output from said request means; said storing and processing means being adapted to command the procedures be automatically executed and to drive supply cut-off means for cutting off the supply to all or part of said computer and peripherals thereof at the end of said procedures.

BRIEF DESCRIPTION OF THE DRAWINGS

Further characteristics and advantages of the invention will become apparent from the description of a preferred but not exclusive embodiment, of the device according to the invention, illustrated only by way of non-limitative example in the accompanying drawings, in which.

DESCRIPTION OF THE PREFERRED EMBODIMENT

Figure 1:
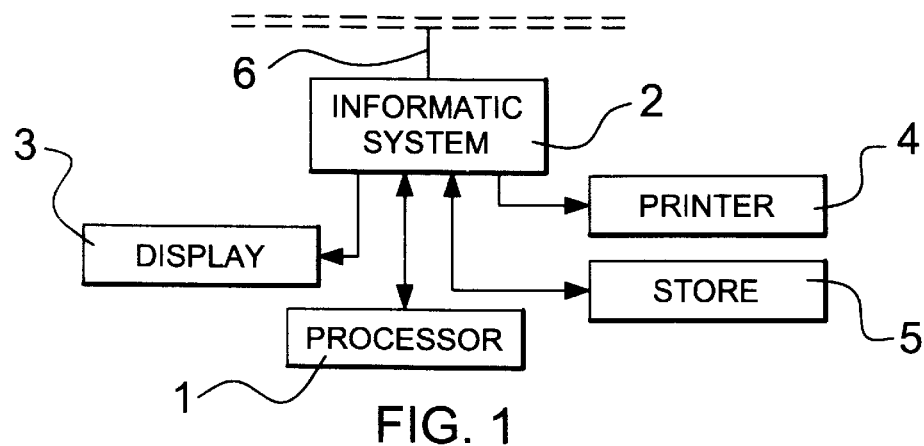
FIG. 1 is a block diagram of an informatic system provided with the device according to the invention.
Figure 2:
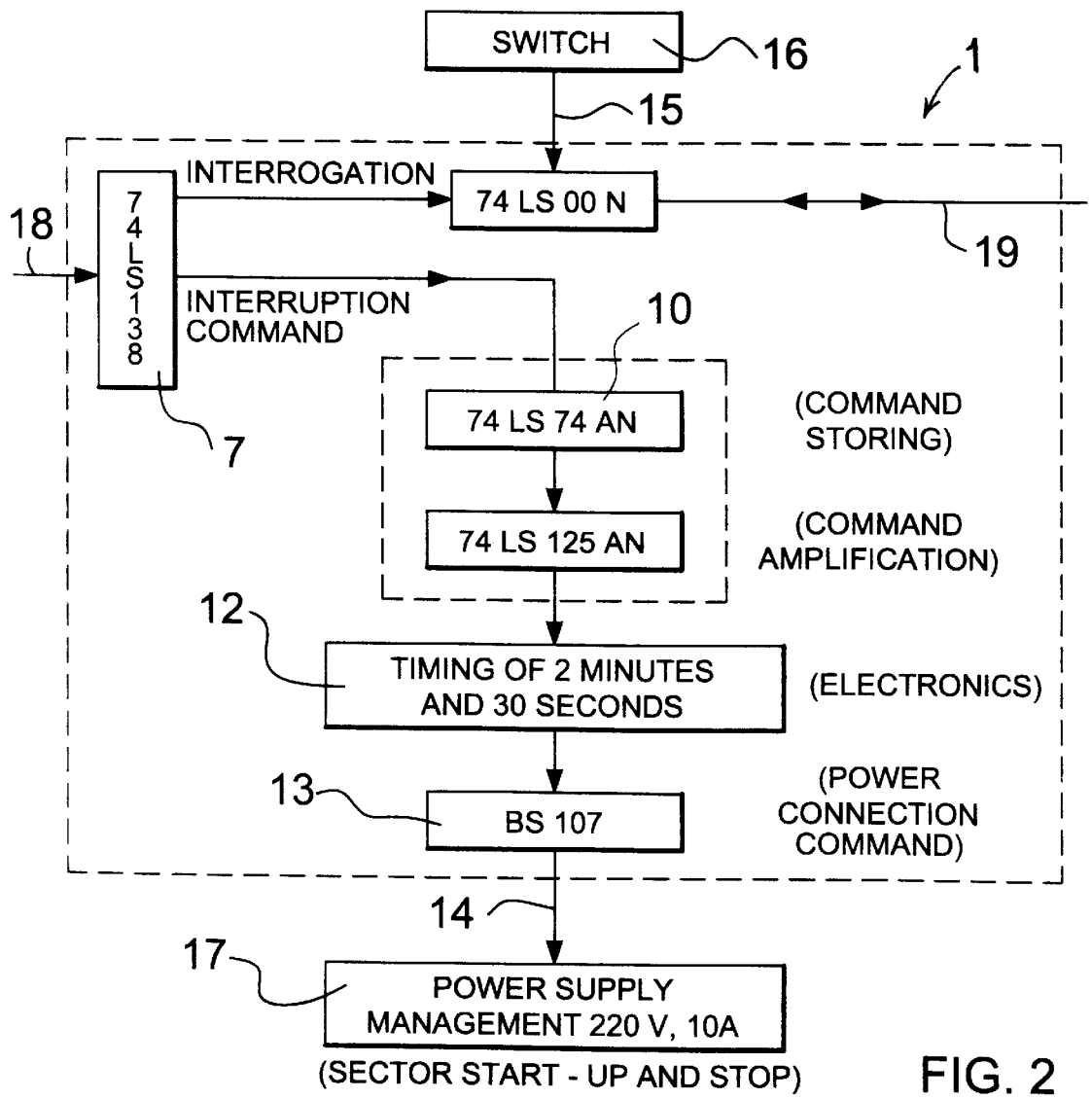
FIG. 2 is a block diagram of a circuit of the device in accordance with the invention.
Figure 8:
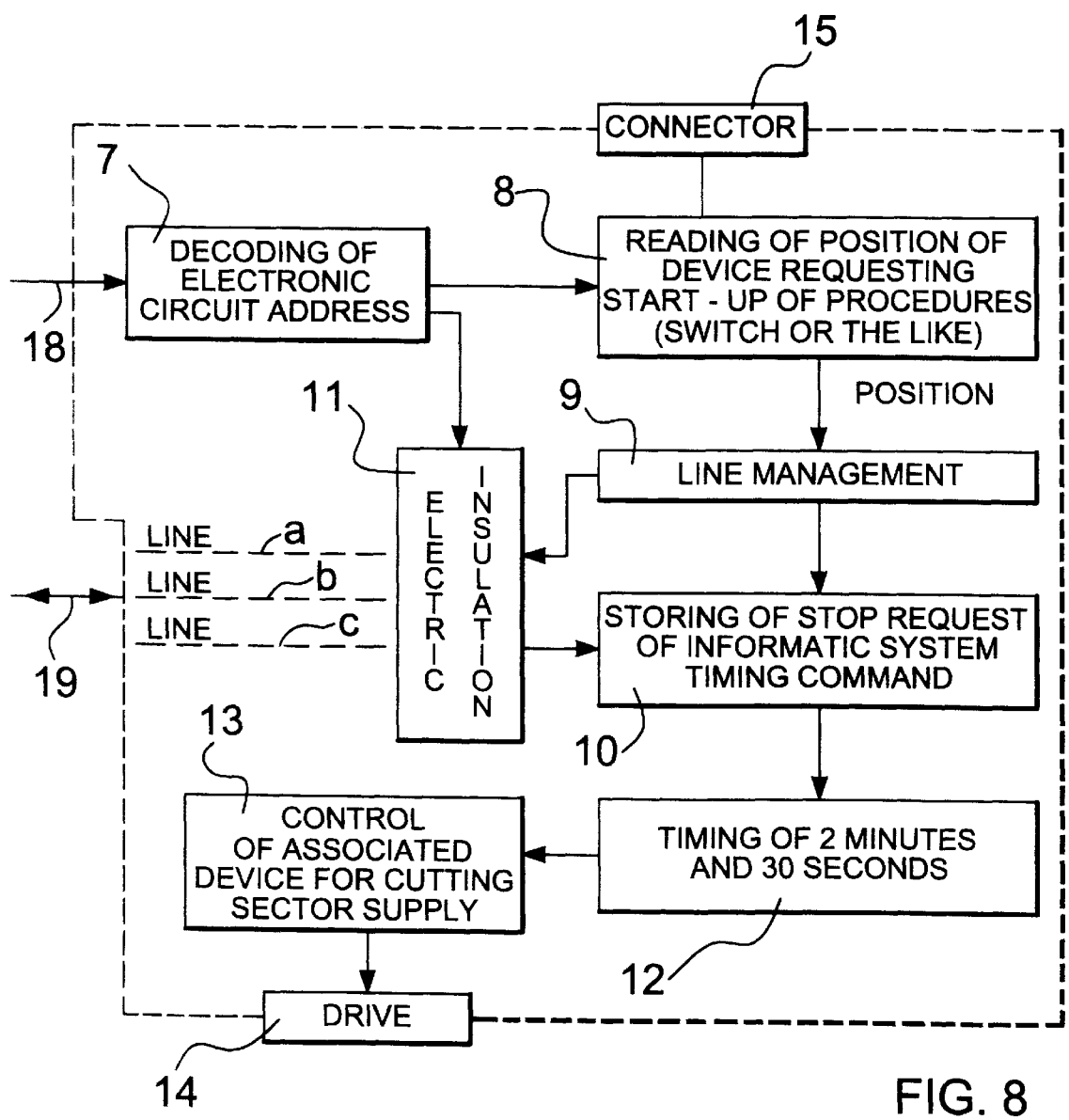
FIG. 8 is a block diagram of the storage means according to the invention.

With reference first to FIGS. 1, 2, and 8, the device according to the invention comprises means, generally indicated with the reference number 1 in FIG. 1, for storing and processing a request of executing procedures. Said means 1 is connected to an informatic system to which a display device a printer and data storage means 5 are connected.

Means 1 for storing and processing procedure execution requests may be integrated within the informatic system or they can be external.

The informatic system 2 can be connected to other informatic systems through a link 6, for example a network.

Storage and processing means 1 can be placed either inside or outside the computer or any peripheral device.

The connection between the means 1 for storing and processing procedure execution requests to an informatic system 2 can be obtained by several communication means such as for example parallel buses, SCSI buses, serial connection, networking, etc.

The storing and processing means 1 receives a control signal from at least one means 16 for requesting the start of procedures, said means consisting advantageously of a key of a keyboard, a touch-responsive screen portion of said display means, a speech recognition device, a switch, a UPS command, hardware clock with or without weekly scheduler either provided with a key-lock capability, or not.

The procedure starting request means are connected to said storage and processing means 1, and can be either inside or outside said storage and processing means 1.

With reference to FIG. 8, and in greater detail, the storage and processing means 1 comprises means 7 for decoding an electronic circuit address connected to means 8 for detecting the location of the procedure starting request means.

Connection means 15 connects said means 8 to the procedure starting request means.

Means 8 is connected to managing means 9 of lines a, b, and c connecting the input/output of the informatic system 2 and the storing and processing means 1, to means 10 storing the request of stopping informatic system 2, and timing or clock command means.

Lines a, b, and c and means 9, and 10 are connected to electric insulation means 11.

Lines a, b, and c form one-way or two-way exchange lines for data, whereas line 18, connected to said decoding means, carries only input data for the storing and processing means 1.

Timing means 12 is connected to the storing and processing means 10, which is adapted to calculating a timing or clock setting for example at 2 minutes and 30 seconds.

Said timing means 12 are finally connected to control means 13 adapted to drive means 14 for connection to supply cut-off means 17, as shown in FIG. 2.

FIG. 2 is a block diagram of an optional embodiment of the device according to the invention, which shows the storing and processing means 1 of FIG. 8 connected to procedure start request means 16 and to supply cut-off means 17.

Figure 7:
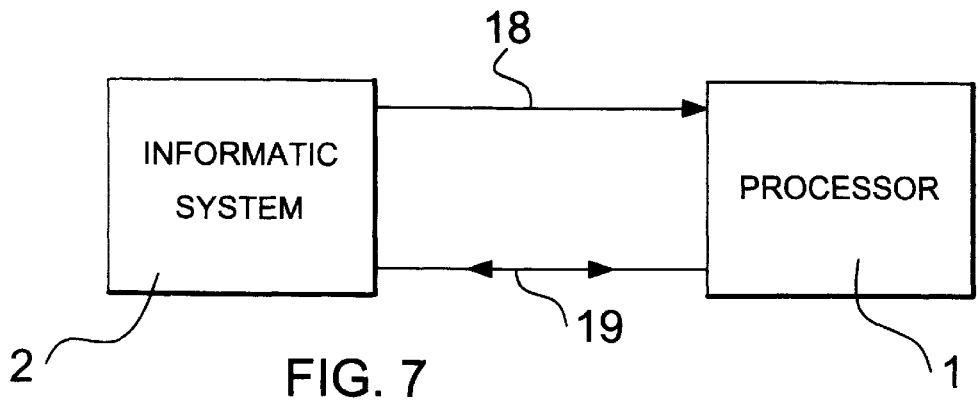
FIG. 7 shows a mode, means, and a method of communication between the storage electronic components and the informatic system according to the invention.

In FIG. 7 the communication between the informatic system (computer with its own operating system) and the storing and processing means 1 is shown. The communication can take place over to two lines: a first one-way exchange line 18 for outputting the electronic circuit address, and a second line 19, formed for example by lines a, b, and c, for the two-way exchange of data.

Outputting the address over line 18 allows a connection to be established between the storing and processing means 1 and the informatic system 2. Said addressing can be realized directly or indirectly by sending a series of simultaneous or time-delayed codes.

Over line 19, communication can be established by putting a zero on the line if a user makes a procedure start request, and by putting a one on the line if no such request is made.

The function of the device according with a first embodiment and according to the figures is as follows.

The storing and processing means for the procedure start request is connected through the communication system consisting of lines 18 and 19, to the microcomputer(s) of informatic system 2.

When the microcomputer(s) reads the request of automatically executing the procedures, it will stop the current operations and execute the procedures corresponding to the parameters which have been pre-selected and inputted by the operator.

At the end of said procedures, the result of said operations is displayed on the screen of the display device 3. The result can also be printed. The various operations are displayed with the relevant result. In this way the operator is kept updated with the procedures which have been carried out. These information can also be displayed at the computer start-up for more comfort and security for the user.

As an alternative, at the mains power connection level, the user has the choice of having part of the informatic system not powered by the device according to the present invention if he wants to keep available part of the computer resources. For example it is possible to keep the mother board of the computer in stand by mode or it is possible to keep the mother board open to be able to access to its directly connected devices, such as disks or tapes, or modem.

FIG. 1 shows an exemplary configuration since it is possible to add terminals, screens, printers, bar code readers, external modems and the like. Depending on the choice of the user, other computers and/or peripherals linked to the mother board can be a part of the informatic system 2.

According to a second embodiment of the invention, the storing and processing means 1 is connected to microcomputer(s) by a standard link, such as for example serial port, parallel bus, SCSI bus, series and parallel connection.

The storing and processing means 1 associated with dedicated software causes the initialization of the status of the microprocessor of the microcomputer(s), when said means 1 require the automatic execution of the procedures.

When the procedures are completed, the microprocessor sets the storing and processing means 1 at a storing condition where cut-off of the supply to informatic system 2 is requested by the cut-off request means 16, Memorizing the cut-off request involves a timing be started. Upon said timing for example after 2 minutes and 30 seconds, the storing and processing means 1 set an electronic output to a condition allowing the associated supply cut-off means 17 to interpret the output as a cut-off command.

The device according to the invention comprises also logical processing and actuating means having the following functions:

creation of procedures, by defining:
    a) name of procedure;
    b) kind or function of procedure;
    c) localization of the procedure of the informatic system 2 (i.e. disk, directory, subdirectory, . . . );
    d) commands necessary for executing the procedure;
    e) commands and means used for verifying the procedure is executed correctly, and for checking the result thereof;

chain-linking of procedures, by defining:
 a) order and priority level of each procedure;
 b) importance level of the obtained result, pointing out whether a negative result involves arresting the chain of procedures to be executed;
 c) the rule used for starting each procedure on the basis of hourly programming, direct chain-linking, is and so on.

The processing and actuation means provides also for actuation of said defined procedures. Disclosing the necessity of actuating a procedure being defined as the creation of a "task" which includes the procedures and adds elements necessary to its chain-linking to another procedure to be executed subsequently.

In addition, said processing and actuation means provides for automatic management of calculation of the "tasks" and for their execution at the due time and without the intervention of the user.

The following table is an example of programming the procedure done by the user:

| PRIORITY | FUNCTION | DATE | TIME |
|---|---|---|---|
| 1 | Virus scanning | Always | Always |
| 2 | Calculation of daily turnover | Always | After 3 p.m. |
| 3 | Up-dating of inventory product | Always | After 3 p.m. |
| 4 | Closing of working day | Always | After 3 p.m. |
| 5 | Editing of turnover and cash volume | Always | After 3 p.m. |
| 6 | Monthly closing | End of month | After 3 p.m. |
| 7 | Editing of monthly turnover | End of month | After 3 p.m. |
| 8 | Back-up copy of files used in starting up | Always | Always |
| 9 | Safety safeguard of data in memory disks | Always | After 3 p.m. |
| 10 | Back-up of Winchester disks | Always | Always |
| 11 | System stop | Always | Always |
| 12 | Cut-off of power supply | Systematic | Systematic |

The above table allows to understand that the device and the relevant process may be actuated during the working day without causing dead times.

On the basis of the date and time of the day, the device performs the corresponding tasks as explained in the above table.

When said tasks are completed, the system will be automatically switched off, and at a time when it is switched on again, it is possible to associate analysis functions and therefore inform the user, on the screen, about the procedure performed and their results.

The procedures may be obviously set by the user by means of a mouse.

In order to have the 'end of day' set of the operations of end of day carried out, it is sufficient to request the procedure in the afternoon.

It is important to understand that the processing and actuation means are not of a clock-controlled type, i.e. the so-called "scheduler".

Said scheduler starts operations at a preset time, thus preventing the use of the system under normal conditions. It does not entail chain-link functions of the different procedures and does not leave the user a complete freedom of use.

In addition, the informatic system 2, in the presence of a scheduler is not disconnected from the mains at the end of the carried out procedures. On the contrary, it is mandatory to leave it turned on.

With reference now to FIGS. 3, 4, 5, 6, and 9, the process according to the invention, which makes use of the above disclosed device comprises the following steps.

Figure 4:
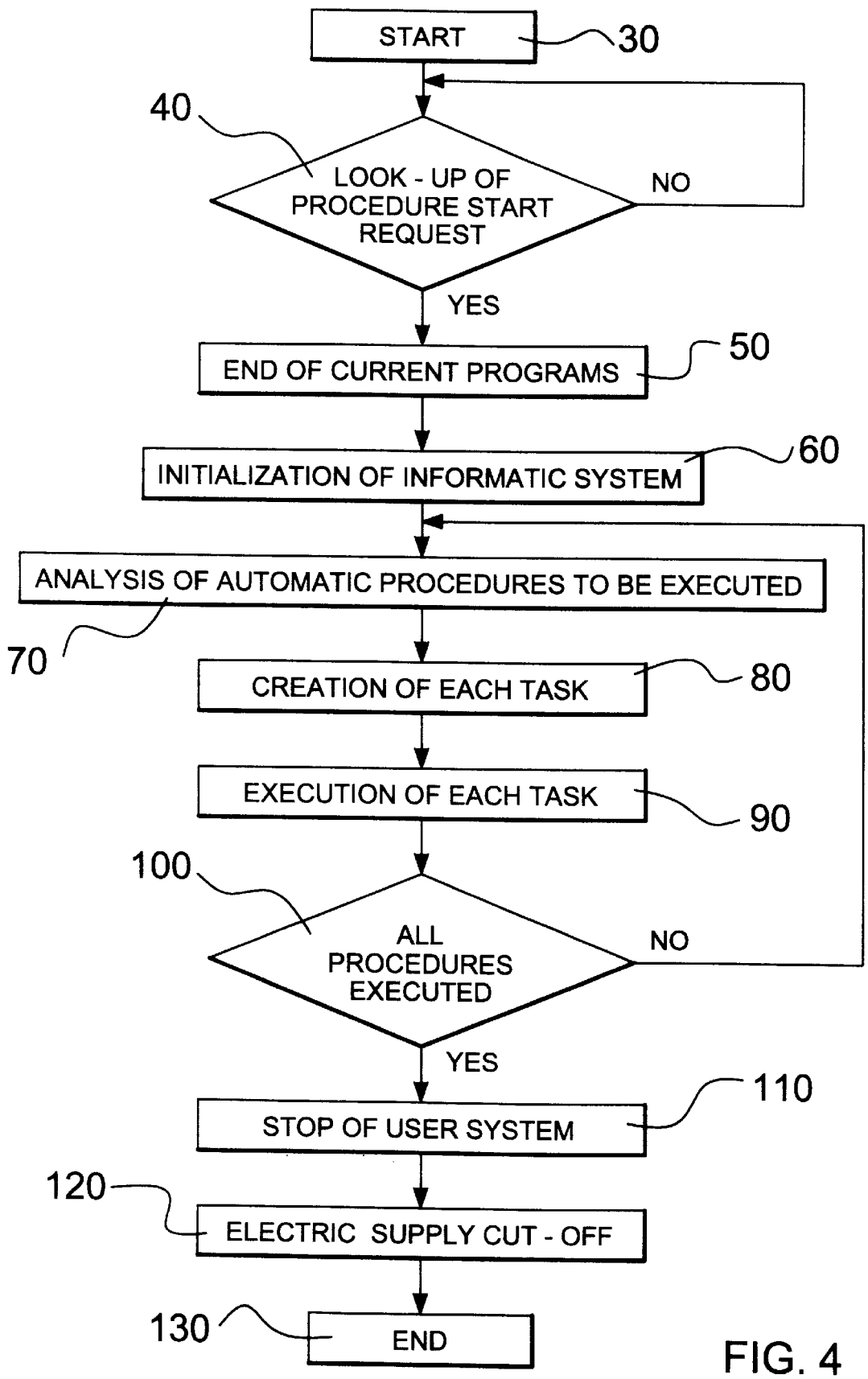
FIG. 4 is a flow chart showing the different steps of the procedures in accordance with this invention.

FIG. 4 is a flow chart of the main steps of the process according to the invention.

After the initial step 30, the consultation step of the procedure start request takes place, verifying the status of the request means 16.

In case step 40 is executed, then step 50 of closing the current programs is performed, otherwise the sequence goes back to step 30.

Subsequently, for initializing informatic system 2 step 60 is carried out.

After step 60, there is step 70 of analysis of the automatic procedure to be executed, which is followed by step 80 for defining each task and then step 90 for executing each task.

Then step 100 follows wherein it is requested whether it is desired to execute all the procedures.

In case of negative answer, the processing goes back to step 70, otherwise it goes to step 110 of arresting the software.

After step 110, there are the electric supply cut-off step 120 and the end step 130.

Figure 3:
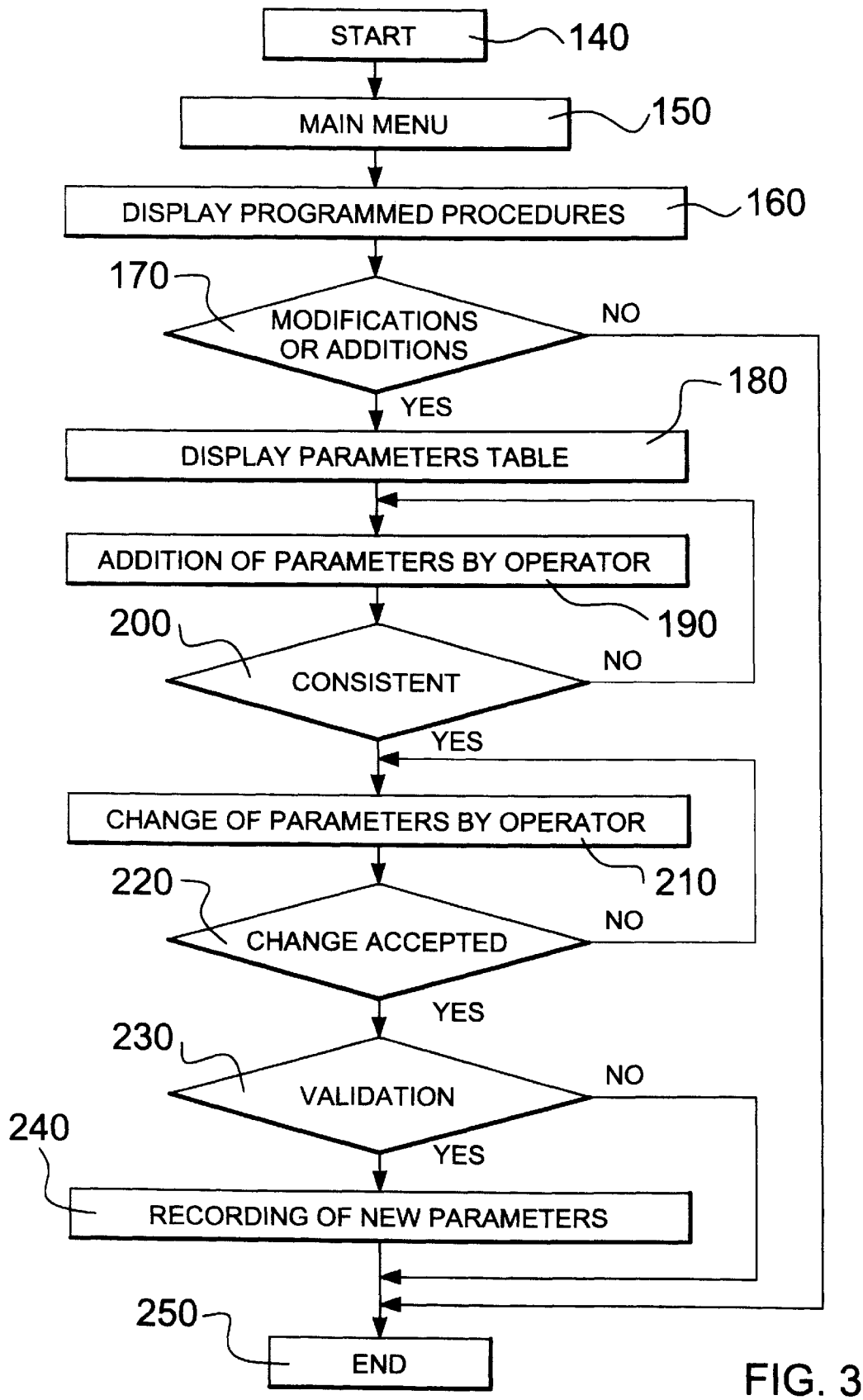
FIG. 3 is a flow chart showing the steps of creation of changes in the chain-linking of the procedures in accordance with this invention.

FIG. 3 shows the flow chart of the step sequence for creating and modifying the procedure link up.

Said sequence starts with initial step 140, which is followed by step 150 of displaying the main menu.

The subsequent step 160 provides for displaying the programmed procedures.

After said step, there is step 110 of request of changes or additions to the procedures already programmed and previously displayed.

In case said request is answered in the negative, the processing goes to end step 250, otherwise it goes to step 180 of displaying the table of modified parameters.

The following step 190 allows the operator to add the desired procedures, the consistency of which is verified in step 200.

If the consistency check is negative, the processing goes back to step 190, otherwise it goes to step 210 of modification of the parameters by the operator.

The subsequent step 220 ascertains the modifications have been acquired In case of negative result, the processing goes back to step 210, otherwise it goes to the following step 230 of validation request.

It the validation request is answered in the negative, processing goes to end step 250, otherwise it goes to step 240 of memorization of the new parameters entered by the operator.

Figure 5:
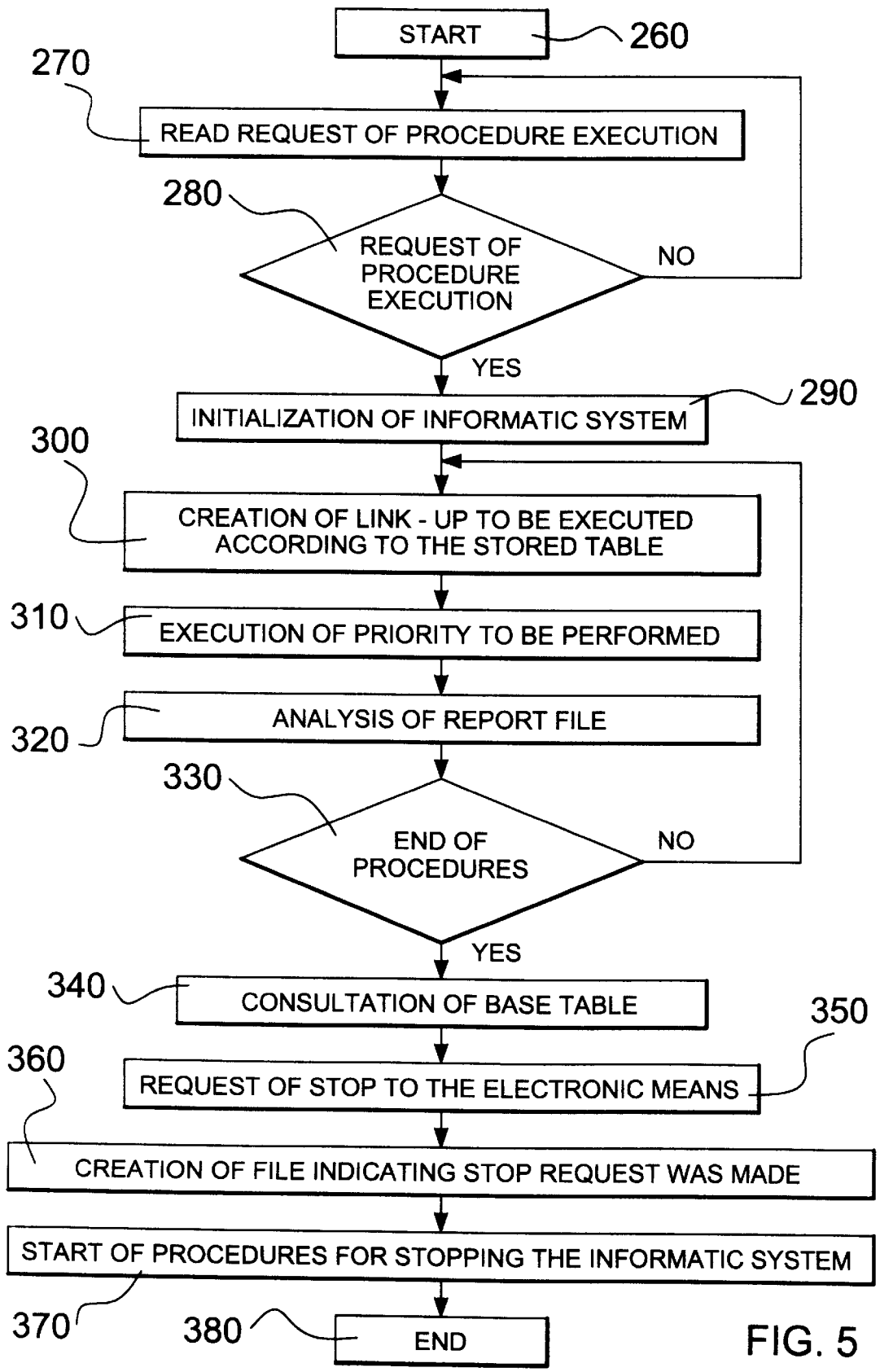
FIG. 5 is a flow chart showing the running of chain-linked procedures in accordance with the method of the invention.

FIG. 5 is a flow chart of the execution steps of the chain-linked procedures.

Said execution starts with step 260 which is followed by step 270 of reading the procedure execution request.

Then there is a request step 280 of executing or running the procedures, In case of negative answer, the processing goes back to step 270, otherwise it goes to step 290 for the initialization of informatic system 2.

Then there is the step of creating the chain-link of the procedures to be executed based on the stared table in accordance with the processing shown in FIG. 2.

The execution of the procedures therefore takes place, in step 310, according to the set priority level, and the result of the processing is analysed in a report file in step 320.

Then there is step 330, where the question is asked whether the procedure is to be ended or not. In the negative, the processing goes to step 310, whereas if the answer is positive, the processing goes to step 340, where the table is looked up.

Then step 350 of transmission of stop request to the storing and processing means 1, and step 360 of creating the file indicating that the stop request has been made, follow.

Subsequently, step 370 of starting procedures for stopping the informatic system 2, and then step 380 are performed.

Figure 6:
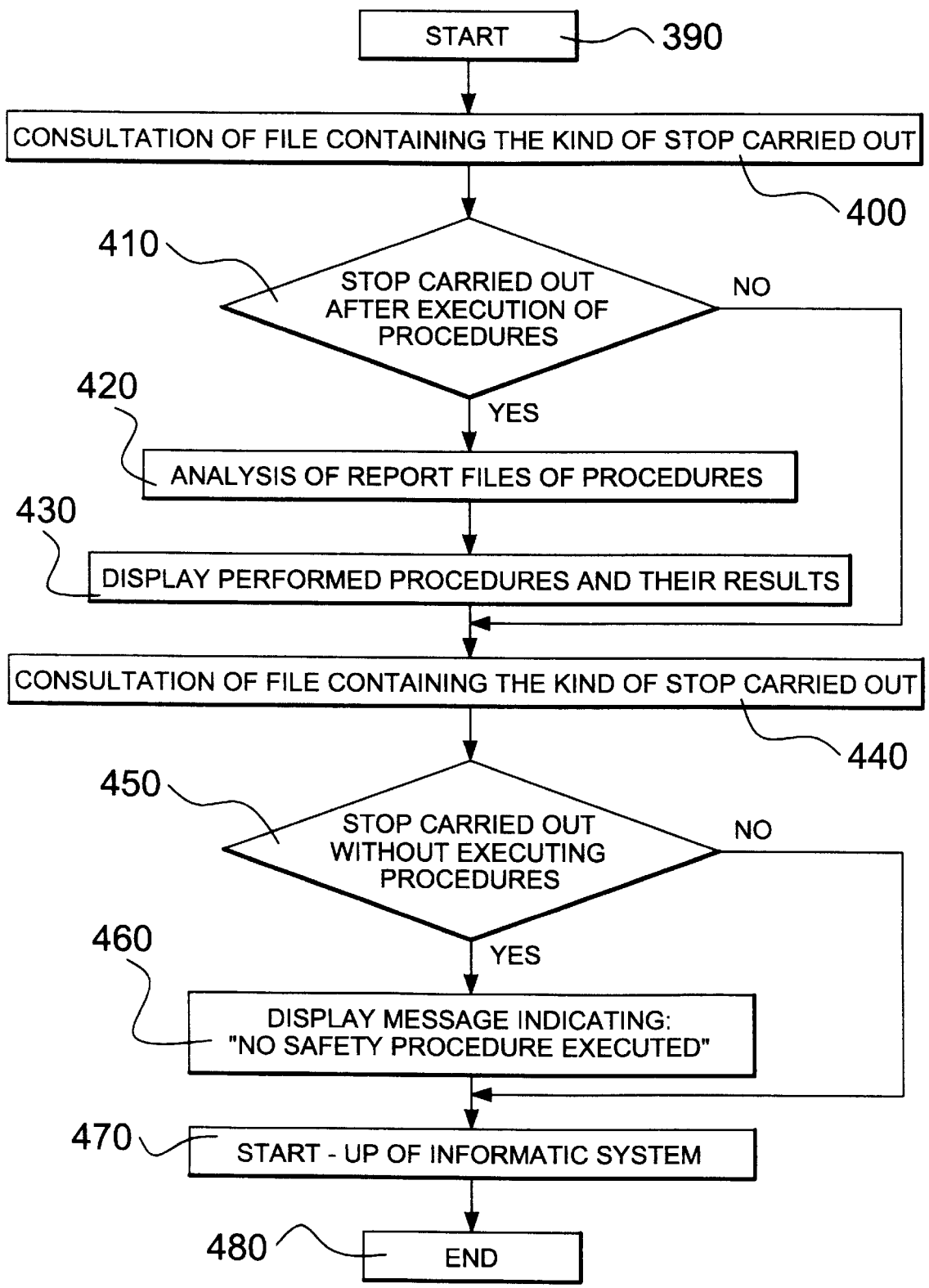
FIG. 6 is a flow chart showing the reactivation of an informatic system provided with a device according to the invention.

FIG. 6 shows as a flow chart, the sequence of the restart steps of informatic system 2.

The restart begins from the initial step 390 to go to step 400 of consulting the file containing the information about the kind of stop executed in the above step 370 of FIG. 5.

Then there is step 410, where the user is asked whether the stop was done after the execution of the procedures. In case of negative answer, the processing goes to step 440 for consulting the file containing the information about the kind of stop executed, otherwise it goes to step 430 for analysing the procedure report file, then to step 430 of displaying the performed procedures and their results, and then to the above mentioned step 440.

Step 440 is followed by step 450 where it is asked whether the stop was done without executing the procedures. If the answer to this question is negative, the processing goes to step 470 of actuating or starting up the informatic system 2, otherwise it goes to step 460 of displaying a message indicating that no safety procedure has been performed.

After step 470 there is step 480.

Figure 9:
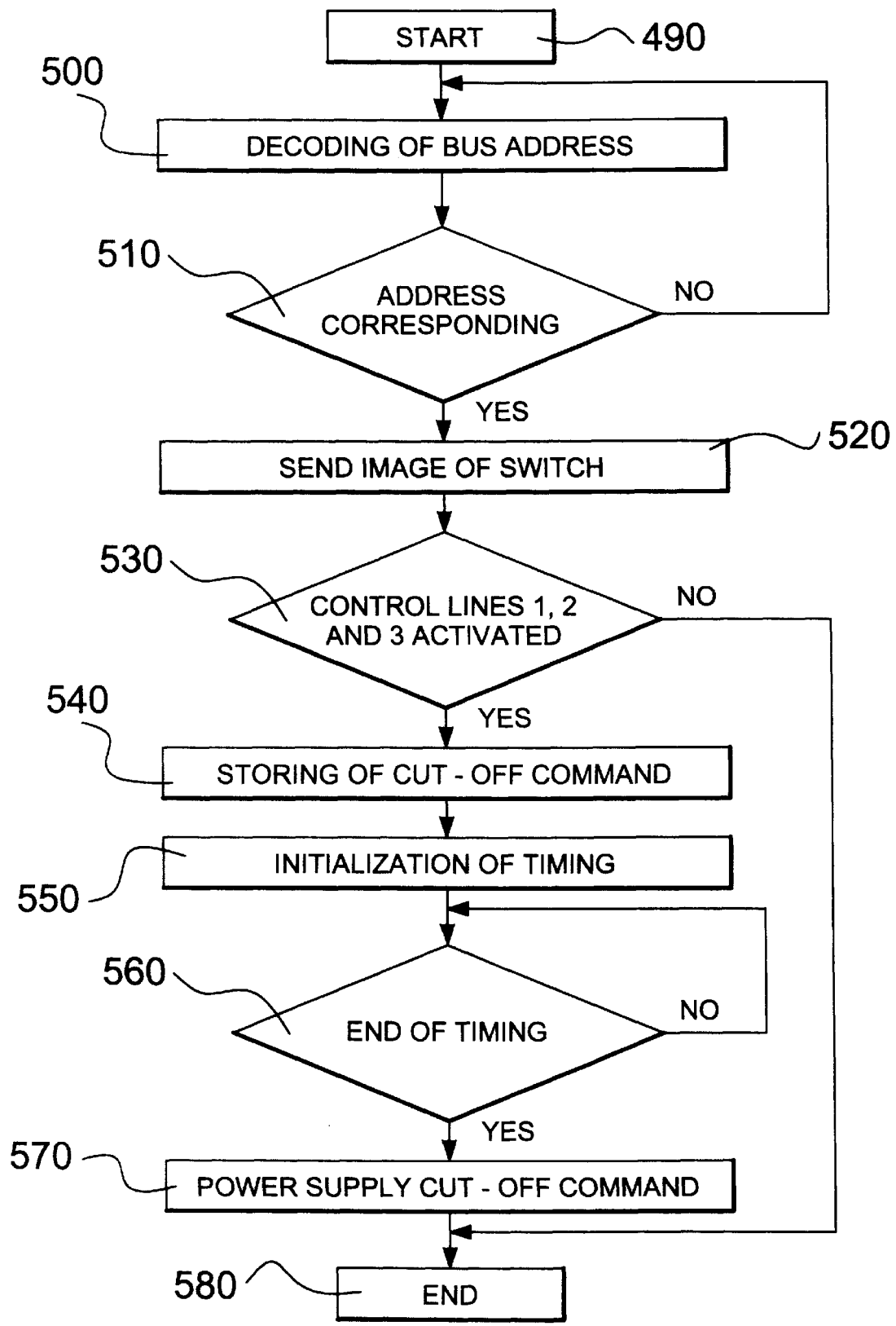
FIG. 9 is a flow chart of the operational steps of the storage means of the invention.

FIG. 9 is a flow chart showing the sequence of the operating steps of storing and processing means 1, and particularly it shows the procedure of reading the position of the procedure start request means 16.

The sequence begins with the initial step 490, which is followed by step 500 of decoding the addresses being present on the connecting bus between the storing and processing means 1 and informatic system 2.

The decoding is done by decoding means 7.

Then there is step 510 where it is asked whether the address corresponds to a request means for requesting the starting of data processing procedures. If the answer is positive, the processing goes to step 520 of outputting the image of switch 16, i.e. the status of the switch (open or closed), otherwise it goes back to step 500.

After step 520, step 530 is carried out for verifying whether the control lines a, b, and c are active. If the answer is negative, the processing goes to the end step 580 otherwise it goes to step 540 of memorizing the interruption request, which is performed by means 10 for memorizing or storing the request to stop the informatic system 2. This is followed by timing start step executed by timer means 12, and then step 560 wherein it is checked whether the timing is elapsed.

If the answer is negative, the processing remains with step 560, otherwise it goes to step 570 for cutting off the power supply to informatic system 2, and thereafter to end step 580.

In practice it has been observed that the device and process according to the present invention fully achieve the intended aim, in that it allows the system to protect, process, and analyse data automatically and without an operator being present.

Also, the device and process according to the invention allow to optimize the effectiveness of the informatic system 2, to increase the useful working time of the user on said system and to carry out operations of end of day, as well as safety operations, without depriving the user of useful time for work.

The safety operation includes not only the back-up of files created by the user during the working day, but also scanning for possible viruses, data zipping for reducing the storing space, reorganization of data, postponed print-outs, and possibly sending facsimiles at reduced price times (usualy in the night).

At the end of the above operations, the device according to the present invention provides to turn off the informatic system connected thereto, without an operator being present.

Finally, compatibility with several operating systems makes the device according to the invention highly versatile.

The device thus conceived is susceptible of numerous modifications and variations, all of which are within the scope of the inventive concept; all the details may furthermore be replaced with other technically equivalent elements.

The exemplary language 'computers, peripheral units, computer networks, and the like' as previously used herein being in no way intended to limit the scope of the invention but only to illustrate possible applications of the inventive concept in conventional terms of art, in the following claims the phrase "data processing system" will be used in its stead, which phrase shall mean any localized or distributed physical device capable of representation by a graph, wherein processors, data storage means and input/output means are characterized as nodes, communication means being characterized as arcs, and wherein the representative graph is connected; said localized or distributed physical device being adapted for the processing, manipulation, storage and recall of electronic or otherwise physically embodied digitally encoded data, and for the input or output of said data in human cognizable form, or in forms otherwise sensed or detected from, or adapted to control or usefully influence, physical processes whose chief utility does not lie in the representation of encoded data.

What is claimed is:

1. A process for periodically executing routinely recurring informatic procedures including data safety and safeguard procedures, for data processing systems, comprising the steps of:

starting routine informatic procedures including data safety and safeguard procedures;

running said procedures;

chain-linking said procedures;

stopping at least one processing means of at least one of said data processing systems;

switching off all or a part of said at least one of said data processing systems; said starting, running, chain-linking, stopping and switching off steps being performed automatically, said stopping and switching off steps being performed automatically upon the termination of said procedures, wherein the starting of the routine informatic procedures includes:

(a) examining the request of starting said procedures, closing the processing currently performed by said computer;

(b) bootstrapping said computer; and (c) analyzing said automatic procedures to be run.

2. A process according to claim 1, wherein said procedure execution step further includes the additional steps of:

displaying predefined procedures; and modifying said predefined procedures, said modification being performed by changing parameters memorized in a table.

3. A process according to claim 2, wherein said modification step of the predefined procedures includes the steps of:

modifying said parameters memorized in a table;

adding customized procedures to said predefined procedures; and storing said modified parameters in said table.

4. A process according to claim 1, wherein said step for chain-linking procedures comprises the step consisting in creating the chain-link on the basis of information stored in said table.

5. A process according to claim 1, wherein said step of running all the procedures further includes the steps of:

controlling the execution of said procedures by creating at least a report file of the execution thereof;

analysing said at least one report file and displaying it on display means.

6. A process according to claim 5, wherein said step of displaying the at least a report file is carried out at the start-up of said computer.

7. A device for executing informatic procedures, including activities of end of day and/or data safety procedures, for data processing systems, comprising:

at least one request means for requesting the starting of data processing procedures; and storing and processing means adapted to receive a procedure starting request signal output from said request means; said storing and processing means being adapted to command the procedures be automatically executed and to drive supply cut-off means for automatic daily cutting off the supply to all or part of at least one of said data processing systems at the end of said procedures, said storing and processing means comprising:

(a) address decoding means adapted to identify a computer comprising part of said data processing system, said computer being connected to said storing and processing means, (b) detecting means for detecting the status of said request means, said detecting means being connected to said decoding means, (c) communication line managing means driven by said detecting means, (d) means for storing or memorizing the request of stopping said computer, and (e) timing means adapted to create a timing after which control means are actuated for controlling said means for cutting off power supply to all or part of said data processing system.

8. A device according to claim 7, wherein said request means comprises a switch.

9. A device according to claim 7, wherein said request means comprises a portion of touch-responsive screen.

10. A device according to claim 7, wherein said request means comprises speech recognition means.

11. A device according to claim 7, wherein said storing and processing means are connected to computer through communication means.

12. A device according to claim 11, wherein said communication means comprises a one-way communication line and two-way communication lines.

13. A device according to claim 11, wherein said communication means comprises a parallel bus.

14. A device according to claim 11, wherein said communication means comprises a serial connection.

15. A device according to claim 11, wherein said communication means comprises a SCSI bus.

16. A device according to claim 7, wherein said storing and processing means for storing and processing the procedure start request are built in said computer.

17. A device according to claim 7, wherein said storing and processing means for storing and processing the procedure start request are external to said computer.

* * * * *